Sept. 29, 1931.    W. MYERS    1,825,635
PILE FABRIC ARTICLE AND PROCESS OF PRODUCING THE SAME
Filed Oct. 16, 1930
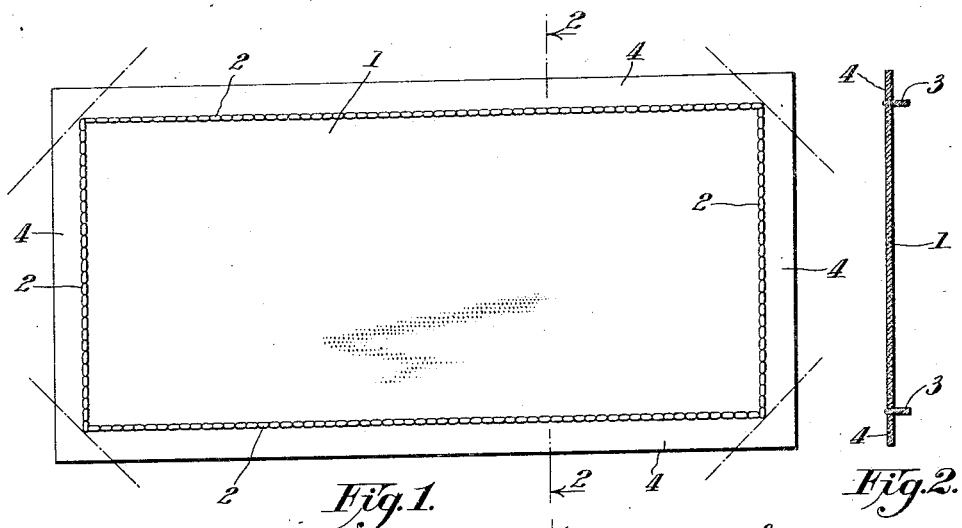
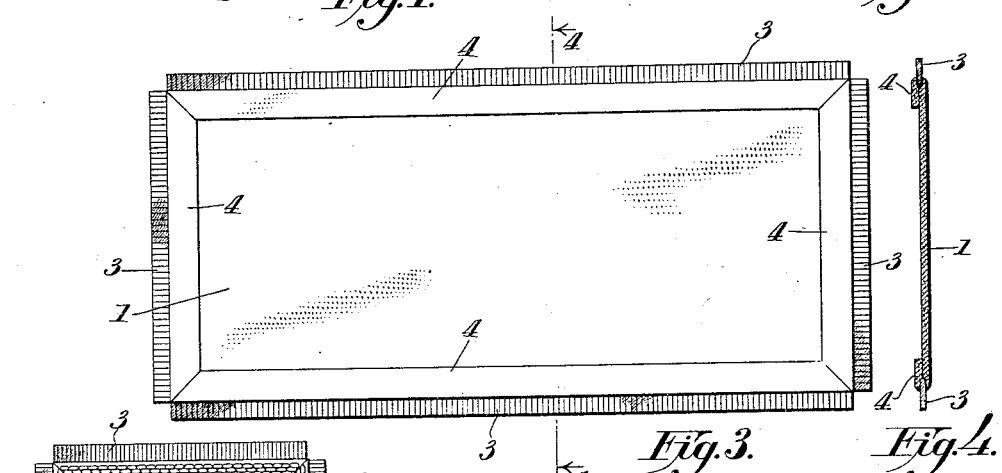
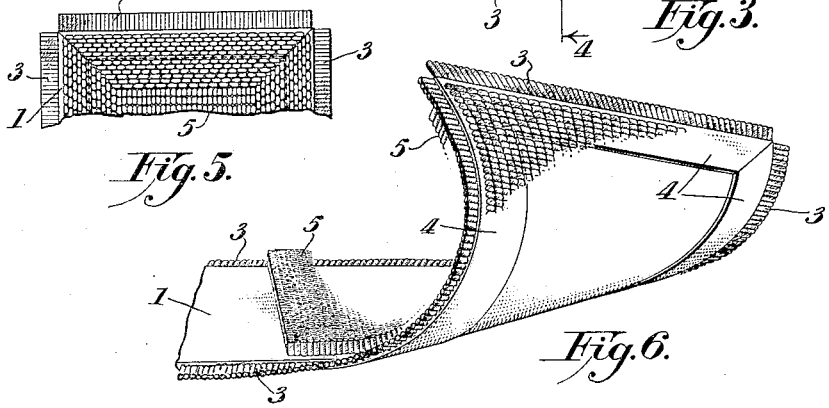
Inventor
Walter Myers
By Henry J Miller
Attorney
Witness:
Godfrey Pering Patented Sept. 29, 1931

1,825,635

UNITED STATES PATENT OFFICE

WALTER MYERS, OF BRIDGEPORT, CONNECTICUT, ASSIGNOR TO THE SINGER MANUFACTURING COMPANY, OF ELIZABETH, NEW JERSEY, A CORPORATION OF NEW JERSEY

PILE-FABRIC ARTICLE AND PROCESS OF PRODUCING THE SAME

Application filed October 16, 1930. Serial No. 489,080.

This invention relates to improvements in pile-fabric articles, such as hook rugs and the like, and in the process of producing articles of this general character.

The primary object of the present invention is to provide, in a simple manner, a fringed margin or margins for pile-fabric articles. A further object of the invention is to simplify the production of a non-ravelling edge for pile-fabric articles in which the base or body material may have an initially unselvedged edge or edges.

With the foregoing and other objects and advantages in view, the invention will best be understood from the following description, taken in connection with the accompanying drawings, in which:

Fig. 1 is a bottom plan view of a body material provided with a rectangular seam of pile-thread loops. Fig. 2 represents a section of the body material substantially on the line 2—2 of Fig. 1. Fig. 3 is a bottom-plan view of the body material with the corners mitered and its margins folded substantially on the seam lines of Fig. 1. Fig. 4 represents a section of the body material substantially on the line 4—4 of Fig. 3. Fig. 5 is a bottom-plan view of a portion of a finished article and illustrates a commonly employed method of running the seams for filling in the pile-thread loops. Fig. 6 is a perspective view illustrating a pile-fabric article made in accordance with the improved process of the present invention and filled in according to a method differing from that of Fig. 5, but also commonly employed.

In the production of pile-fabric articles by the present improved process, any suitable body material may be employed, as for instance one or more plies of canvas, regardless of whether or not the body material margins have selvedge edges.

Referring to the drawings, which illustrate several steps in the process of manufacturing hook rugs, a body material 1 of preferably rectangular outline, is provided in the margin thereof with a seam 2 of turfing stitches. The turfing stitches may be in the form of cut-open lops 3 of thread, yarn or the like, preferably projecting from one face of the body material in a direction substantially normal thereto, as indicated in the drawings, or the loops 3 may be left closed and, if desired, cut open at a later stage. To speed production, it is preferred to employ a turfing machine in which the loops of thread are cut open during the formation thereof, although it is obvious that the seam might be otherwise produced, as by means of other types of turfing machines or by hand implements. In the manufacture of rectangular rugs or similar articles, the outline of the seam preferably corresponds with the rectangular shape of the body material, with the seam lines substantially parallel with the edges of said body material.

The corners of the body material are mitered by cutting off said corners substantially as indicated by the dot-dash lines in Fig. 1 of the drawings, i. e., at a 45° angle to the seam lines and substantially through the vertices thereof, it being preferred, but not essential, to cut off the body material corners after the seam 2 is formed.

As indicated in Figs. 3 and 4 of the drawings, the body material margins 4 are then folded on the seamlines 2 upon one face of said material, the mitered corners obviating objectionable bulging of the material, as will be self-evident. By folding the body material, as described, the loops 3 of pile-thread project outwardly beyond the fold edges in directions substantially parallel with a face of the folded material, thereby not only providing non-ravelling edges for the article, but also producing a fringe which, being formed by thread loops anchored in the fold edges, naturally projects in the proper direction from said fold edges. It is obvious that this fringe might be formed on less than the full number of the article margins, as for instance at only two margins opposite each other.

While the folded margins 4 may be otherwise secured, it is preferred to employ for that purpose a row or successive rows or seams of stitched pile-thread loops 5 which are preferably anchored in the fold-margin face of the body material and project from the opposite or upper face thereof in a direction substantially normal thereto, said rows of loops 5 being preferably continued to cover the entire face of the body material, although in the filling in of the article face, the threads may be varied as to color and design of application to produce different embroidery effects. As illustrated in Fig. 5 of the drawings, the filling-in seams may be directionally run to produce, in themselves, a mitered effect adjacent the corners of the finished article, or the body material face may be covered by substantially parallel seams throughout, as illustrated in part in Fig. 6 of the drawings.

By practicing the preferred process herein described, the completed article, including the fringe thereof, may be produced throughout by the same turfing machine or implement, thereby reducing the necessary handling of the work to a minimum.

Having thus set forth the nature of the invention, what I claim herein is:—

1. A process of producing pile-fabric articles, comprising stitching a row of pile-thread loops in a body material to project from a face of said material in a direction substantially normal thereto, folding said body material on the line of the row of the pile-thread loops in a manner whereby the pile-threads project outwardly beyond the fold edge in a direction substantially parallel with a face of said material, and securing the fold by an additional row or row of pile-thread loops.

2. The process of producing pile-fabric articles, comprising stitching a row of pile-thread loops in the margin of a body material to project from a face of said material in a direction substantially normal thereto, folding said body material on the line of the row of pile-thread loops in a manner whereby the pile-threads project outwardly beyond the fold edge in a direction substantially parallel with a face of said material, and subsequently to said folding operation forming additional stitched rows of pile-thread loops to project from the face of the body material directly opposite to the fold margin thereof and in a direction substantially normal to said face.

3. The process of producing pile-fabric articles, comprising stitching a seam of pile-thread loops in a rectangular outline in a body material, folding the body material margins on the lines of said seam in a manner whereby the pile-threads project outwardly beyond the fold edges, securing the material fold, and stitching additional rows of pile-thread loops in said body material.

4. The process of producing pile-fabric articles, comprising stitching a seam of pile-thread loops of rectangular outline in a body material, folding the body material margins on the lines of said seam in a manner whereby the pile-threads project outwardly beyond the fold edge, and forming additional rows of pile-thread loops in the edge-folded portion of the body material to project from one face of the latter in a direction substantially normal thereto.

5. The process of producing pile-fabric articles, comprising stitching seams of pile-thread loops in the margins of a body material, folding the body material margins on the seam lines thus formed in a manner whereby the pile-threads project outwardly beyond the fold edges, and covering the folded body material by additional rows of pile-thread loops.

6. A pile-fabric article, comprising a body material having a margin thereof folded upon a face of the body material, stitched pile-thread loop anchored in and projecting outwardly beyond the fold-edge in a direction substantially parallel with a face of the body material, and stitched pile-thread loops anchored in the folded margin of the body material and projecting from the face of said body material opposite to the fold margin side thereof.

In testimony whereof I have signed my name to this specification.

WALTER MYERS.